US006230554B1

(12) United States Patent
Kramer

(10) Patent No.: US 6,230,554 B1
(45) Date of Patent: May 15, 2001

(54) SYSTEM AND METHOD FOR DETERMINING A PERFORMANCE CHARACTERISTIC OF A VEHICLE COMPONENT BASED UPON TEMPERATURE, LOAD, ROAD GRADE AND TIME

(75) Inventor: Dennis A. Kramer, Troy, MI (US)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 0 days.

(21) Appl. No.: 09/226,590

(22) Filed: Jan. 6, 1999

(51) Int. Cl.[7] .................................................... G06F 17/00

(52) U.S. Cl. ............................................ 73/118.1; 701/29

(58) Field of Search ................................... 73/116, 117.2, 73/117.3, 118.1; 701/29, 35, 101, 103

(56) References Cited

U.S. PATENT DOCUMENTS 5,552,987 * 9/1996 Barger et al. .................. 364/424.06
5,648,898 * 7/1997 Moore-McKee et al. ........... 364/191
5,754,965 * 5/1998 Hagenbuch ............................ 701/35
6,038,498 * 3/2000 Briffle et al. ............................. 701/3
6,052,644 * 4/2000 Murakami et al. .................... 701/93

* cited by examiner

*Primary Examiner*—George Dombroske
(74) *Attorney, Agent, or Firm*—Carlson, Gaskey & Olds

(57) ABSTRACT

A method and system for determining the performance characteristics of at least one selected vehicle component utilizes a plurality of variables and takes into account the interrelationship of those vehicles. Specifically, a detected temperature, load and road grade condition are utilized to determine a rate of change in a performance characteristic of a selected component relative to time. The rate of change information is provided to a vehicle operator on a real-time basis and stored in memory for later use by a service technician. Determining a performance characteristic based on a plurality of variables and storing information regarding that characteristic over time provides additional useful information to a service technician enabling the technician to more quickly and effectively diagnose potential problems with the vehicle components.

18 Claims, 1 Drawing Sheet

SYSTEM AND METHOD FOR DETERMINING A PERFORMANCE CHARACTERISTIC OF A VEHICLE COMPONENT BASED UPON TEMPERATURE, LOAD, ROAD GRADE AND TIME

BACKGROUND OF THE INVENTION

This invention generally relates to diagnostic systems for motor vehicles. More particularly, this invention relates to a method and system for determining a performance characteristic of a selected vehicle component based upon temperature, load, road grade and time.

There are a variety of commercially available diagnostic tools available to assist technicians in servicing vehicles. A variety of sensors and mechanisms have been developed to assist in monitoring the performance of vehicle components. Such sensors include speed sensors, for example, which assist in monitoring the rotational speed of a wheel axle and temperature sensors that provide indication of temperatures within vehicle fluids and lubrications.

Although a variety of such sensors are available, there use has not been exploited to the fullest possible extent. For example, rotational speed sensors and oil pressure sensors typically only provide information while the vehicle is in motion. When a vehicle is brought into a service establishment, a service technician does not have the benefit of the information obtained by those sensors since the last time that the vehicle has been in for service. Moreover, there are situations where combinations of sensor information can be useful but this feature has not been implemented in any useful way.

This invention provides an improved system and method for monitoring performance characteristics of vehicles utilizing a plurality of detected variables. Additionally, this invention provides the ability to record such information over time and later provide that information to a service technician to enhance the ability to efficiently and effectively diagnose potential vehicle problems and appropriately service the vehicle.

SUMMARY OF THE INVENTION

In general terms, this invention is a system for monitoring the performance of a selected vehicle component taking into account a plurality of variables. The system includes a first sensor supported on the vehicle that detects a temperature of the selected vehicle component. A second sensor is supported on the vehicle and detects a load supported by the vehicle. This second sensor is especially useful in heavy duty vehicles such as trucks, which carry loads of widely varying amounts. A third sensor detects the grade of the road surface along which the vehicle is traveling. An electronic controller communicates with each of the sensors and utilizes the three different variables to determine a performance characteristic of the selected vehicle component. The electronic controller also determines a rate of change of the performance characteristic relative to time and provides an output indicating that rate of change.

In the preferred embodiment, a display is provided within the vehicle for the driver to visibly observe the monitored performance characteristic and the rate of change of that characteristic relative to time. Additionally, the preferred embodiment includes a memory module within the electronic controller that stores data regarding the performance characteristic, the detected variables and the rate of change of the performance characteristic relative to time. When the vehicle is brought in for service, the electronic controller preferably communicates with an external computer device through a communication port supported on the vehicle so that a service technician has access to all of the data within the memory module of the electronic controller.

A system designed according to this invention provides improved diagnostic capabilities for a service technician and gives better performance information that otherwise is not available by utilizing information from single sensors alone. Taking into account the combined effects of temperature, load and road grade, for example, provides more realistic and useful data for a service technician to quickly diagnose a potential problem on a vehicle.

The various features and advantages of this invention will become apparent to those skilled in the art from the following detailed description of the currently preferred embodiments. The drawings that accompany the detailed description can be briefly described as follows.

DETAILED DESCRIPTION OF THE PREFERRED EMBODIMENT

Figure 1:
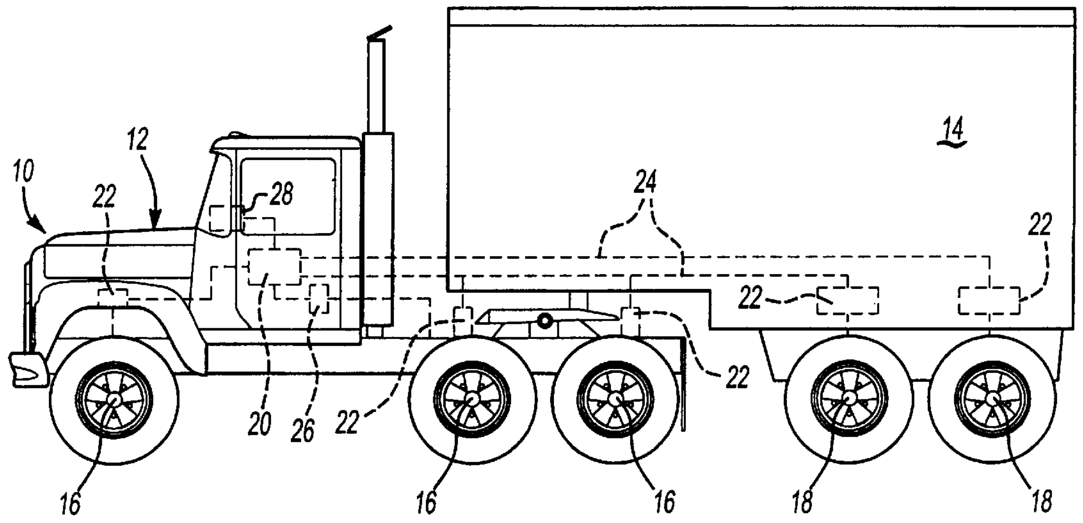
FIG. 1 is a diagrammatic illustration of a heavy duty vehicle incorporating a system designed according to this invention.

FIG. 1 diagrammatically illustrates a heavy duty vehicle 10 including a cab portion 12 and a tailer portion 14. As is typical, the heavy duty vehicle 10 includes a plurality of wheel axles 16 on the cab portion and trailer axles 18. An electronic controller 20 is supported on the vehicle and communicates with a plurality of sensor arrangements 22, which are respectively associated with each of the wheel axles. Communication lines 24 are schematically illustrated to demonstrate the communication between the electronic controller 20 and the sensor arrangements 22. Another sensor 26 detects a road grade (i.e., incline) at a current location of the vehicle. Additionally, a display 28 preferably is provided within the cab portion 12 so that a vehicle operator can observe information provided by the electronic controller 20.

Figure 2:
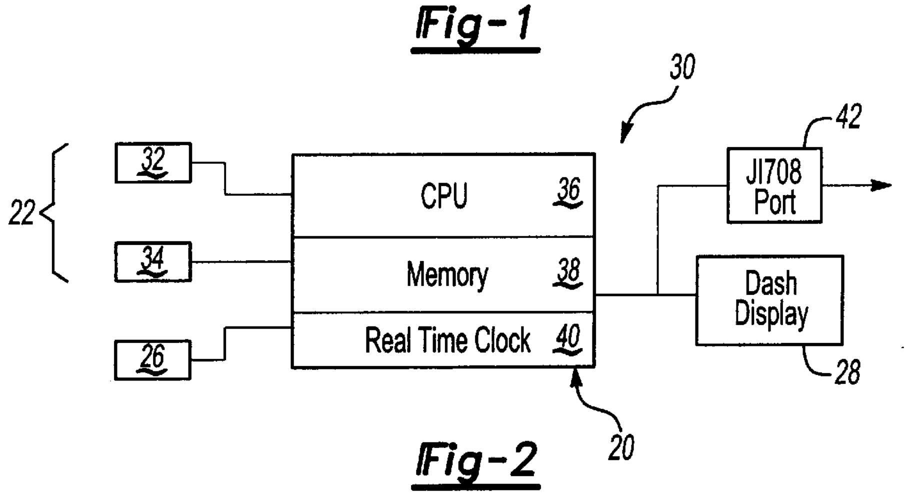
FIG. 2 is a schematic illustration of a system designed according to this invention.

FIG. 2 schematically illustrates a system 30 designed according to this invention. Each of the sensor arrangements 22 preferably includes a first sensor 32 that detects a temperature of a selected vehicle component. For purposes of discussion, the wheel axles 16 and 18 will be considered as the selected vehicle component. Those skilled in the art, however, will realize that this invention is applicable to other vehicle components such as transmission components or other portions of the drive train of a heavy duty vehicle, for example. The sensors 32 can be realized through a variety of commercially available sensors such as a thermistor supported in the oil sump of one of the axles.

A second sensor 34 detects a load supported by the vehicle 10. A plurality of second sensors 34 preferably are provided so that the load can be detected at each of the wheel axles of the vehicle. A variety of commercially available sensors can be implemented such as axle load sensors that detect an amount of air pressure within the air suspension system at a given axle.

The third sensor 26 that detects the road grade conditions at a current vehicle location may take a variety of forms. In one example, an analog tilt sensor is supported on the vehicle and detects the road grade based upon the position of the vehicle caused by the incline in the road surface. In another example, the vehicle 10 includes a global positioning device that permits access to a global positioning database that includes topographical or altitude information regarding particular locations. In this second example, the system 30 utilizes the information from the global positioning database to determine changes in altitude between multiple locations or road grade conditions at the current vehicle location.

The electronic controller 20 is schematically illustrated having a central processing unit module 36, a memory module 38 and a clock portion 40. Those skilled in the art will realize that the "divisions" of the electronic controller 20 are for schematic, discussion purposes only and do not necessarily represent separate physical portions of a microprocessor. The clock portion 40 preferably is a real-time clock function incorporated into the electronic controller 20. Alternatively, a time reference can be obtained from a global positioning device on vehicles where such devices are provided.

The electronic controller 20 communicates with the first, second and third sensors 32, 34 and 26. The information gathered by the sensors is utilized by the electronic controller 20 to determine a performance characteristic of a selected vehicle component (i.e., a wheel axle). The performance characteristic takes into account combined information gathered from the individual sensors. The electronic controller 20 preferably is programmed to determine the performance characteristic and to determine a rate of change of the performance characteristic relative to time.

The electronic controller 20 preferably is programmed to determined whether the rate of change of the performance characteristic is outside of an expected range. The expected range of the rate of change preferably is dependent upon the variables detected through the sensors 26, 32, and 34. This invention takes into account the recognition that heavier vehicle loads and greater road inclines typically result in greater increases in wheel axle temperature, for example. Therefore, the electronic controller 20 preferably is programmed to take into account the currently detected variables from the sensors and to utilize that information to determine the current performance characteristic, the rate of change relative to time and whether the rate of change is within an expected range.

The electronic controller 20 preferably provides a real-time display on the display 28 for the operator of the vehicle. The display 28 preferably is a reconfigurable display that allows a vehicle operator to observe any individual detected variable or the performance characteristic determined by the electronic controller 20.

Additionally, the system 30 preferably includes a communication port 42 that permits a service technician to utilize an external computer device (not illustrated) to access data from the memory portion 38 of the electronic controller 20. This feature enables a service technician to obtain information regarding the performance characteristic and the rate of change relative to time as if the service technician were in the vehicle during operation since the last visit to the service establishment. Having such ready access to the information determined by the electronic controller 20 provides the service technician with the ability to more quickly diagnose potential problems and to address specific portions of the vehicle that may require service. Without such information, it is impractical for a service technician to manually inspect the large number of vehicle components that potentially could require service. With this invention, the service technician is able to quickly discern the portions of the vehicle that need to be addressed and serviced at a given time. Moreover, a vehicle operator is provided with a real time display of the performance characteristic and, therefore, is given the ability to determine when a vehicle may need immediate service.

Given this description, those skilled in the art will be able to choose from among commercially available devices to realize the sensors and the electronic controller 20, which preferably is realized through a conventional microprocessor. Additionally, given this description, those skilled in the art will be able to develop the specific software to enable the electronic controller to perform the desired functions described in this specification.

Figure 3:
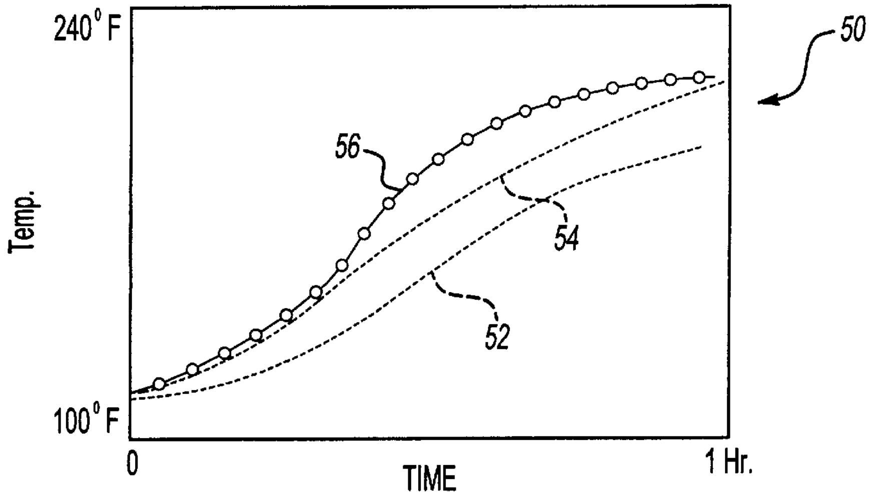
FIG. 3 is a graphical illustration demonstrating the results obtained by a system designed according to this invention implementing the method of this invention.

FIG. 3 graphically illustrates the performance of the system 30. A graph 50 includes a first plot 52 showing a two-dimensional map of the change in temperature relative to time of a selected vehicle component (i.e., one of the wheel axles). The plot 52 shows the rate of change of the performance characteristic for a first vehicle that is relatively heavily loaded (i.e. carrying a load of 38,000 lbs. on the drive axle tandem) and traveling along a relatively flat road surface. A second plot 54 illustrates the same vehicle driving along a road having a three percent change in grade. As can be appreciated from the illustration, the rate of change of the performance characteristic relative to time is somewhat greater in the plot 54 than in the plot 52. Additionally, the overall temperature of the selected vehicle component is somewhat greater in the plot 54 than in the plot 52.

A third plot 56 illustrates the rate of change of a vehicle having a much smaller load (i.e., total load of 1,000 lbs.) traveling along a road surface having a three percent grade change. The rate of change of the temperature relative to time and the plot 56 is much higher than shown in the plots 52 and 54. This illustrates a potential problem in the drive axle because this is an abnormal rate of temperature increase. With this invention, the driver and a service technician will be alerted to this condition, which otherwise would not have been possible even if the temperature of the selected vehicle component were monitored. If one were to consider the temperature in isolation, the difference between the plots 54 and 56 would not be discernable because the peak temperature is approximately the same in both instances. The rate of change in the performance characteristic determined by the system 30 of this invention, therefore, provides additional diagnostic information to a service technician to realize that a portion of the vehicle drivetrain such as a lubrication line may need immediate attention and service.

The description just given provides an example implementation of this invention. Variations and modifications may become apparent to those skilled in the art that do not depart from the purview and spirit of this invention. The scope of legal protection given to this invention can only be determined by studying the following claims.

What is claimed is:

1. A system for monitoring the performance of a selected vehicle component taking into account a plurality of variables, comprising:

a first sensor supported on the vehicle that detects a temperature of the selected vehicle component;

a second sensor supported on the vehicle that detects a load supported by the vehicle;

a third sensor that detects a grade of a road surface along which the vehicle is travelling; and an electronic controller that communicates with each of the first, second and third sensors and determines a performance characteristic of the selected vehicle component based upon the detected temperature, load, and road surface grade and determines a rate of change of the characteristic relative to time and provides an output indicative of the rate of change.

2. The system of claim 1, further comprising a display positioned within the vehicle and wherein the electronic controller causes the display to provide a visible indication of the performance characteristic and the rate of change for an operator of the vehicle.

3. The system of claim 2, further comprising a communication port coupled to the electronic controller and wherein the electronic controller includes a memory module that stores data regarding the performance characteristic and the rate of change relative to time and wherein the electronic controller communicates the data from the memory module to an external computer device through the communication port.

4. The system of claim 1, wherein the third sensor comprises an analog tilt sensor supported on the vehicle.

5. The system of claim 1, wherein the third sensor comprises a global positioning device that communicates with a database which includes information regarding road surface elevations at various locations and the system utilizes a current vehicle location and information from the database to determine the road grade.

6. The system of claim 1, wherein the electronic controller determines a rate of change of the temperature of the selected vehicle component and determines if the rate of change is outside of an expected range and wherein the expected range is determined by the electronic controller dependent on the detected load and road grade.

7. The system of claim 1, wherein the second sensor comprises an axle load sensor that detects a load supported near an axle on the vehicle based upon an amount of pressure within a suspension device associated with the axle.

8. The system of claim 1, wherein the electronic controller utilizes a combination of the detected temperature, load, and road surface grade information when determining the rate of change of the performance characteristic relative to time.

9. The system of claim 1 wherein the electronic controller determines if the rate of change of the performance characteristic is outside of an expected range and wherein the expected range is determined dependent on at least two of the detected temperature, load and road grade.

10. A method of monitoring the performance of a selected vehicle component taking into account a plurality of variables, comprising the steps of:

(A) detecting a temperature of the selected component;

(B) detecting a load supported by the vehicle;

(C) detecting a road grade at a current vehicle location;

(D) determining a performance characteristic of the selected component utilizing the detected temperature, load and road grade at the current vehicle location; and (E) determining a rate of change of the performance characteristic relative to time.

11. The method of claim 10, further comprising storing data regarding the performance characteristic and the rate of change over time.

12. The method of claim 10, further comprising providing a visual display to a driver indicative of the performance characteristic and the rate of change on a real time basis.

13. The method of claim 10, wherein step (D) is performed using an analog tilt sensor supported on a vehicle.

14. The method of claim 10, wherein step (D) is performed by determining a location of the vehicle using a global positioning device and accessing a global positioning database that includes road elevation information and determining the road grade at the current vehicle location from the database information.

15. The method of claim 10 wherein step (d) includes using a combination of the detected temperature, load and road grade.

16. The method of claim 10 including determining an expected range based upon at least two of the detected temperature, load and road grade, and determining if the rate of change of the performance characteristic is outside of the expected range.

17. The method of claim 10 including determining a rate of change of the temperature of the selected vehicle component and determining if the rate of change is outside of an expected range.

18. The method of claim 17 including determining the expected range based upon the detected load and road grade.

* * * * *